(12) United States Patent
Pyron

(10) Patent No.: US 8,118,330 B2
(45) Date of Patent: Feb. 21, 2012

(54) OPEN POSITION COVER MOUNT FOR CONDUIT BODIES

(75) Inventor: Roger Pyron, Arlington, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 450 days.

(21) Appl. No.: 12/389,841

(22) Filed: Feb. 20, 2009

(65) Prior Publication Data

US 2009/0223958 A1 Sep. 10, 2009

Related U.S. Application Data

(60) Provisional application No. 61/034,351, filed on Mar. 6, 2008, provisional application No. 61/075,101, filed on Jun. 24, 2008.

(51) Int. Cl.
*F16L 11/118* (2006.01)

(52) U.S. Cl. ............ 285/149.1; 285/154.1; 174/50.51

(58) Field of Classification Search .......... 285/149.1, 285/150.1, 151.1, 154.1, 154.2, 154.3, 154.4, 285/152.1; 174/50, 50.61, 66, 67
See application file for complete search history.

(56) References Cited

U.S. PATENT DOCUMENTS

| | | | |
|---|---|---|---|
| 1,433,430 A | 10/1922 | Taylor | |
| 1,759,365 A * | 5/1930 | Pearson et al. | 285/154.1 |
| 1,767,226 A | 6/1930 | Pearson | |
| 1,777,504 A | 10/1930 | Selah | |
| 1,793,261 A | 2/1931 | Stieglitz | |
| 2,099,918 A | 11/1937 | Winter | |
| 2,199,683 A | 5/1940 | White | |
| 2,272,178 A | 2/1942 | McDowell et al. | |
| 2,498,135 A * | 2/1950 | Rock, Jr. | 220/245 |
| 2,800,247 A * | 7/1957 | Appleton | 220/327 |
| 2,952,488 A | 9/1960 | Appleton | |
| 3,029,965 A | 4/1962 | Maier | |
| 3,038,702 A | 6/1962 | Trunnell | |
| 3,430,799 A | 3/1969 | Maier | |
| 3,944,184 A | 3/1976 | Fisch | |
| 4,508,371 A | 4/1985 | Maier | |
| 4,791,258 A | 12/1988 | Youtz et al. | |
| 4,801,118 A | 1/1989 | Wium | |
| 4,896,784 A | 1/1990 | Heath | |
| 4,909,481 A | 3/1990 | Tamm | |
| 4,936,478 A | 6/1990 | Bozdeck | |

(Continued)

FOREIGN PATENT DOCUMENTS

CA 2008296 A1 11/1990

(Continued)

OTHER PUBLICATIONS

Chilean Examination Report for Chilean Application No. 0525/2009.

*Primary Examiner* — David E Bochna
(74) *Attorney, Agent, or Firm* — Hoffman & Baron LLP

(57) ABSTRACT

A cover for a conduit body device for accommodating wire therethrough including: a substantially flat elongated portion with at least two butterfly-shaped clips located at opposite ends of the elongated portion, wherein the butterfly-shaped clips are designed to engage the interior of the conduit body device. In one aspect, the present invention may include at least one ledge on the cover. In addition, a conduit body device and cover system for accommodating wire therethrough.

7 Claims, 7 Drawing Sheets

U.S. PATENT DOCUMENTS

| | | |
|---|---|---|
| 5,029,817 A | 7/1991 | Tamm |
| 5,161,580 A | 11/1992 | Klug |
| 5,391,837 A | 2/1995 | Carey |
| 5,621,189 A | 4/1997 | Dodds |
| 5,820,255 A | 10/1998 | Carrington et al. |
| 5,843,532 A | 12/1998 | Dodds |
| 6,049,040 A | 4/2000 | Biles et al. |
| 6,069,317 A | 5/2000 | Wagganer |
| 6,469,250 B1 | 10/2002 | Decore et al. |
| 6,527,302 B1 | 3/2003 | Gault et al. |
| 6,580,029 B1 | 6/2003 | Bing |
| 6,833,505 B1 | 12/2004 | Macchietto |
| 6,838,615 B2 | 1/2005 | Pyron |
| 6,885,805 B2 | 4/2005 | Asada |
| 6,916,014 B1 | 7/2005 | Thomas |
| 7,007,986 B2 | 3/2006 | Lodwick, Jr. |
| 7,057,104 B1 | 6/2006 | McCleskey |
| 7,425,150 B1 | 9/2008 | Roe, Jr. et al. |
| 7,484,711 B2 | 2/2009 | Pyron |
| 7,954,858 B2 * | 6/2011 | Pyron ........................ 285/149.1 |
| 2007/0289765 A1 | 12/2007 | Lammens, Jr. et al. |
| 2008/0033877 A1 | 2/2008 | Blair et al. |

FOREIGN PATENT DOCUMENTS

| | | |
|---|---|---|
| EP | 1093200 A1 | 4/2001 |
| GB | 2 254 966 | 10/1992 |
| WO | 2006/097956 A2 | 9/2006 |
| WO | 2006106552 A1 | 10/2006 |

* cited by examiner

OPEN POSITION COVER MOUNT FOR CONDUIT BODIES

CROSS-REFERENCE TO RELATED APPLICATION

This application claims priority to U.S. Provisional Patent Application Nos. 61/034,351, filed Mar. 6, 2008 and 61/075,101, filed Jun. 24 2008, herein incorporated by reference.

FIELD OF THE INVENTION

The present invention relates generally to a cover for a conduit body containing electrical wires, and more particularly, relates to a cover for a conduit body which facilitates the passage of wires and cables therethrough and allows for inspection of wires through the open conduit body without fully disengaging the cover.

BACKGROUND OF THE INVENTION

Electrical conduit systems are required in order to safely provide electrical power to industry, homes, commercial buildings and the like. These conduit systems often include long runs of rigid electrical conduit with frequent changes in direction, such as 90° turns. Conduit bodies are typically installed in the conduit systems at various locations, both to provide access to the wires and to route the wires along the conduit path. Often, the change of direction in the conduit is accomplished in the conduit body.

Conventional conduit bodies are generally elongate having longitudinal side walls defining an open ended chamber.

A removable cover may be provided to close the open end after installation. However, during the post-installation inspection stage, the cover must remain in an open position, permitting inspection of the conduit body interior. Once the inspection is complete, the conduit can be fully closed.

Some traditional conduits have a pair of holes on the body of the conduit at the open end for receiving a pair of screws extending through the cover. Thus, a user can simply screw in one side of the cover, allowing the cover to pivot and keep the conduit body open. This allows the conduit body and cover to remain partially attached, while still allowing inspection of and access to the interior. Thereafter, the other screw may be engaged so as to fully close the conduit.

However, many existing conduit bodies, in particular Form 7 conduit bodies, lack screw holes, and rely upon a cover having a pair of "L-shaped" clips on the underside of the cover body for attachment to an undercut lip area at the ends of the open side of the conduit body. Further, Form 7 conduit bodies have extensive undercuts only at opposite ends of the opening, which makes attachment difficult. It is difficult, if not impossible to partially attach the cover to this conduit body to provide access to the interior, and thus the cover must be kept separate from the conduit body until it is ready for final attachment. The cover is usually haphazardly thrown into a box with other covers and conduit bodies of varying sizes. When the user wishes to attach the cover to the installed conduit body, such as after inspection, the user may have great difficulty finding the proper cover for the conduit body installed. This is a time-consuming process that can be avoided by the invention described herein. Sometimes, the user may tape the cover to the conduit before final attachment, which not only fails to effectively hold the cover thereto, but also requires messy cleanup and is a waste of time and materials.

It is, therefore, desirable to provide a cover for a conduit body which allows for the inspection of the wires within the body without fully disengaging the cover, and which overcomes the deficiencies of the prior art.

SUMMARY OF THE INVENTION

In one aspect of the invention, there is provided a cover for a conduit body device for accommodating wire therethrough including: a substantially flat elongated portion with at least two butterfly-shaped clips located at opposite ends of the elongated portion, wherein the butterfly-shaped clips are designed to engage the opposite interior sides of the conduit body device.

In another aspect, there is provided a conduit body device for accommodating wire therethrough the device including: a conduit body having elongate perimetrical side walls, a bottom wall, and an open wall extending along the elongate perimetrical side walls defining a body interior; and a removable cover, the removable cover including a substantially flat elongated portion, and at least two butterfly-shaped clips located at opposite ends of the elongated portion; where the butterfly-shaped clips are designed to engage the interior of the conduit body at the open wall.

In another aspect of the invention, there is provided a cover for a conduit body device for accommodating wire therethrough including: a substantially flat elongated portion with at least two butterfly-shaped clips located at opposite ends of the elongated portion and a ledge disposed at a location proximal to at least one of the butterfly-shaped clips, where the butterfly-shaped clips are designed to engage the opposite interior sides of the conduit body device and the ledge is designed to engage the exterior side of the conduit body when the cover is in a partially attached position.

In yet another aspect, there is provided a conduit body device for accommodating wire therethrough, the device including: a conduit body having elongate perimetrical side walls, a bottom wall, and an open upper end extending along the elongate perimetrical side walls defining a body interior; and a removable cover, the removable cover including a substantially flat elongated portion, at least two butterfly-shaped clips located at opposite ends of the elongated portion, and a ledge disposed at a location proximal to at least one of the butterfly-shaped clips; where the butterfly-shaped clips are designed to engage the interior of the conduit body at the open upper end, and the ledge is designed to engage the exterior of the conduit body when the cover is in a partially attached position.

BRIEF DESCRIPTION OF THE PREFERRED EMBODIMENT

The present invention provides a cover for a conduit body for use in electrical systems, including electrical conduit systems, where electrical wire and cables are run through various structures. The conduit body which is used in conduit systems allows the wires to be pulled through the conduit system and also affects changes of direction in the system. The inventive cover system allows for a cover to be easily attached, and further allows for partial attachment of a cover without requiring screws and holes in the conduit body.

Generally, a conduit body is an elongate tubular shaped member, which is generally formed of a material which matches the conduit employed in the system. A typical conduit body is formed, for example, of metal, plastic, or combinations thereof. Any desired metals may be used, including metals such as iron, aluminum, steel or other suitable metal. Various types of conduit bodies are used, including those commonly referred to as "Form 7" bodies and "Form 8" bodies. Other forms are useful in this invention.

A conduit body includes a conduit body wall including an upwardly extending perimetrical side wall, which extends around an interior chamber, a bottom wall and an opposed open upper end. The open upper end provides access to the interior of the conduit body chamber, and may be closed with a removable cover. One such conduit body for use in this invention is the conduit body described in Applicant's co-pending U.S. application entitled "Large Capacity Universal Conduit Bodies", U.S. application Ser. No. 12/265,075, and having a filing date of Nov. 5, 2008, and which is incorporated in full herein by reference.

Figure 1:
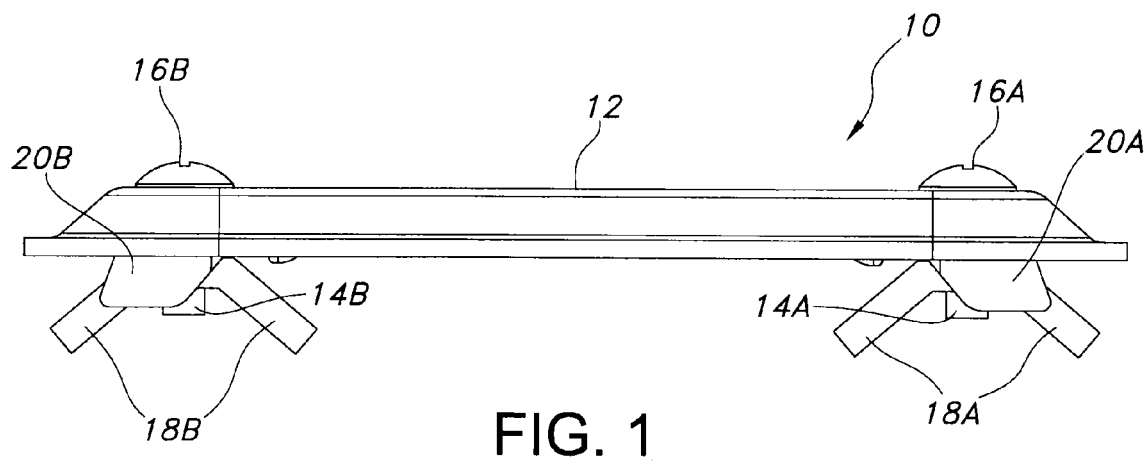
FIG. 1 shows a side angle of one embodiment of a cover of the present invention.
Figure 2:
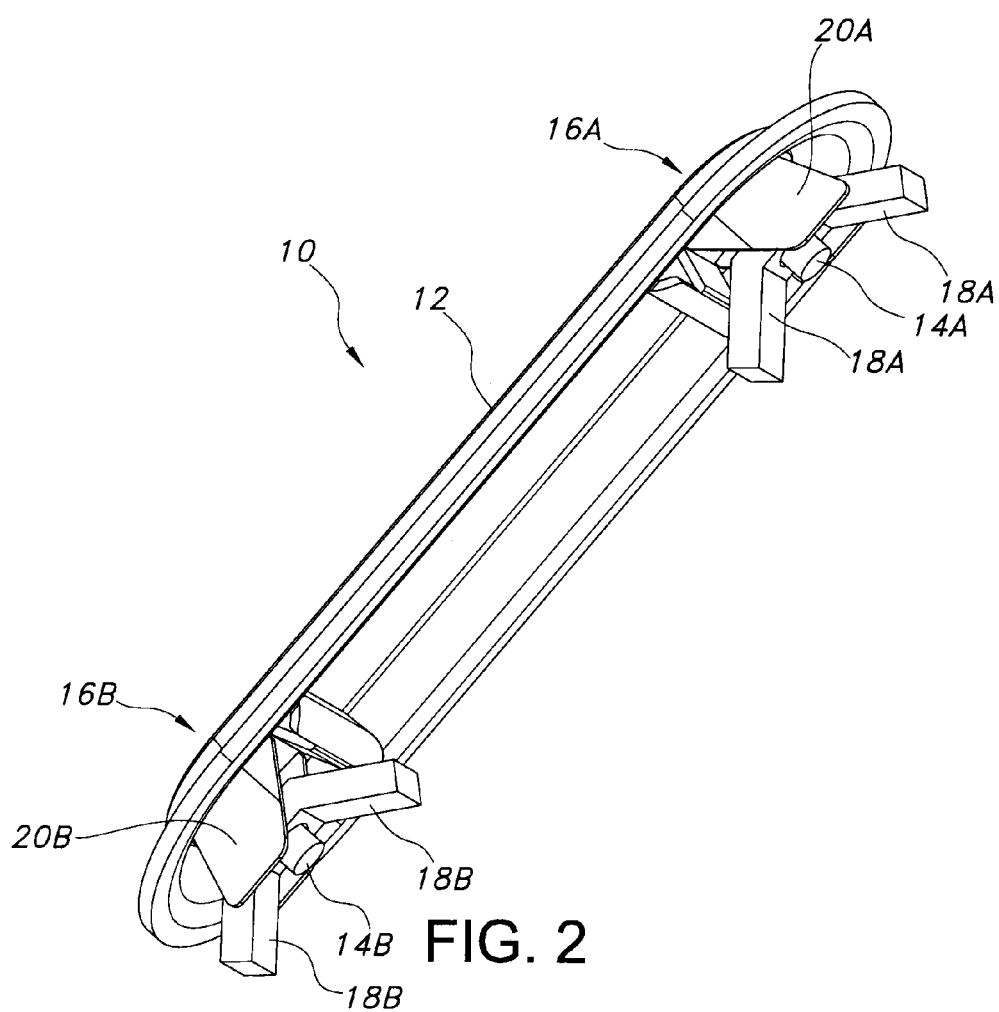
FIG. 2 shows a perspective view of the cover of FIG. 1.

With reference to FIGS. 1 and 2, the cover of the present invention is shown. The cover 10 is substantially flat, and is preferably sized to fit over the open end of a conduit body. The cover 10 has a generally elongate body 12 with at least two attachment means located at opposite end regions of the elongate body. In a preferred embodiment, the attachment means includes a butterfly shaped clip 14 on the underside of the cover 10, and a screw 16 through the body 12 of the cover 10, designed to engage the butterfly shaped clip 14. In a preferred embodiment, the cover 10 includes two butterfly shaped clips 14A, 14B, each located at opposite end regions of the body 12. More than two butterfly shaped clips 14 may be used if desired. For example, four butterfly clips 14 may be incorporated, each being disposed adjacent an edge of the body 12 of the cover 10. Desirably, each butterfly-shaped clip 14 includes a screw portion 16 and a pair of opposed symmetrically extending wings 18.

The cover 10 may be made of any material desired, including plastic, metal, or combinations thereof. In a preferred embodiment, the cover 10 is made of the same material as the conduit body to which it will be attached, but they may be different materials.

Figure 3:
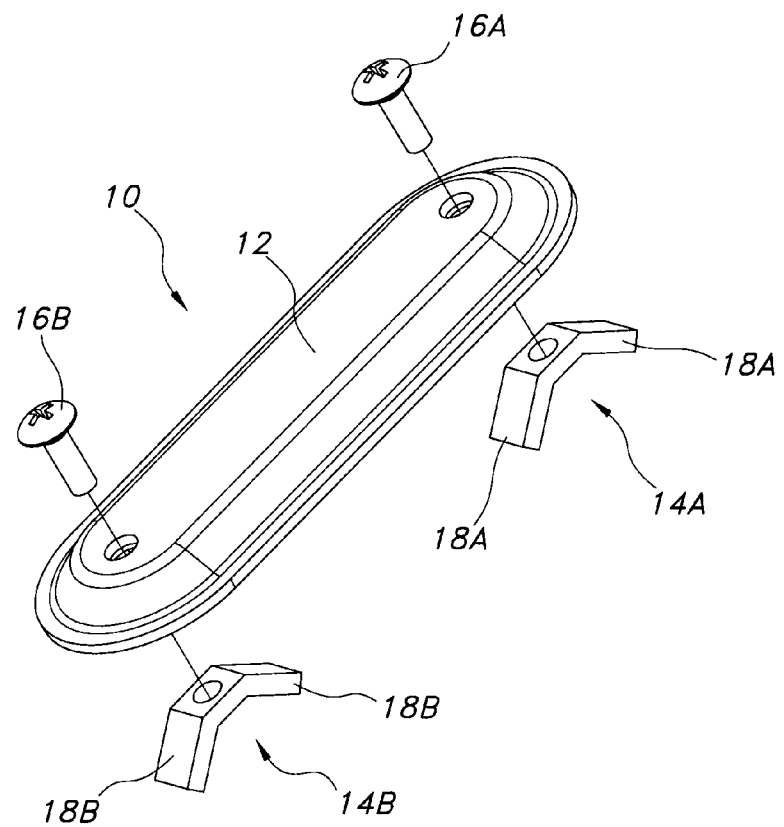
FIG. 3 shows the cover of FIG. 1 with butterfly-shaped clips and screws being attached thereto.
Figure 4:
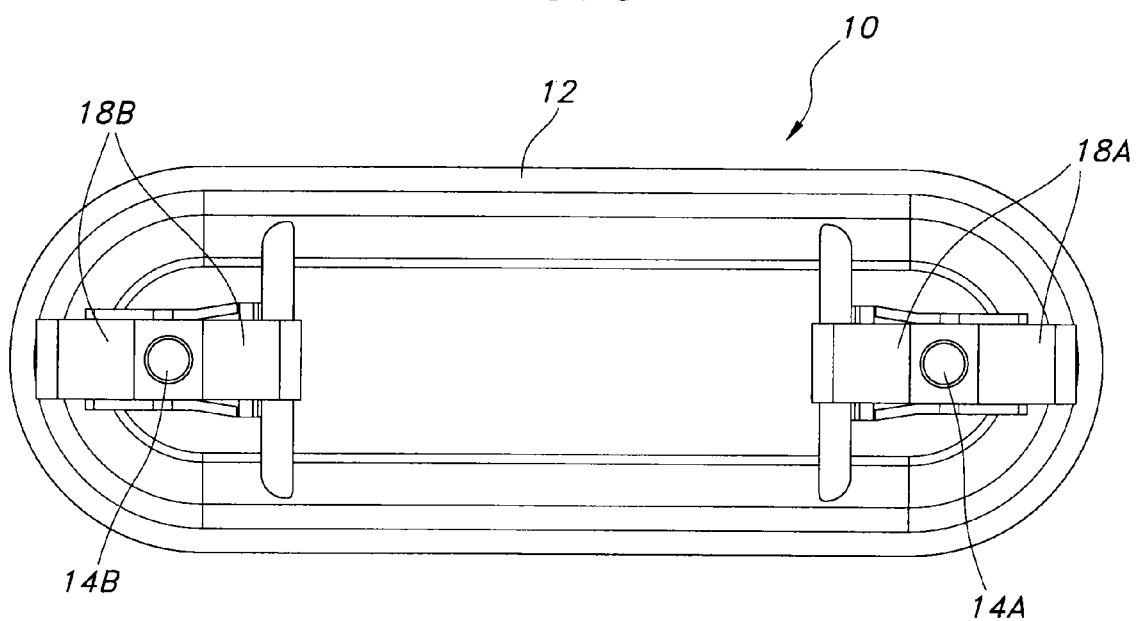
FIG. 4 shows the underside of the cover of FIG. 1.

FIG. 3 shows the attachment of the butterfly clips 14A, 14B to the body 12 of the cover 10. As can be seen, the body 12 of the cover 10 has two screw holes into which screws 16A, 16B are inserted. Butterfly clips 14A, 14B are presented on the underside of the body 12 and are threaded onto the screws 16A, 16B. Optionally, the assembly may include adjacent abutment walls 20, which prevent butterfly clips 14A, 14B from rotating when screws 16A, 16B are rotated. The butterfly clip 14 is configured to be approximately symmetrical about the screw 16 to which it is attached. In contrast, traditional "L-shaped" clips for covers are not symmetrically located about the screw. Although two clip-screw attachments are shown in FIG. 3, it is contemplated that any number of attachments may be used in the cover of the present invention. FIG. 4 is a depiction of the underside of the body 12 of the cover 10 with two butterfly clips 14A, 14B attached. Butterfly clips 14A, 14B are arranged along the elongate axis of the body 12 (as shown). The clips 14 are designed to be prevented from rotating when the screw 16 is tightened, which is accomplished by twin abutment walls 20, which are disposed on opposite sides of each butterfly clip 14, so that the butterfly clip 14 is always properly aligned.

Figure 5:
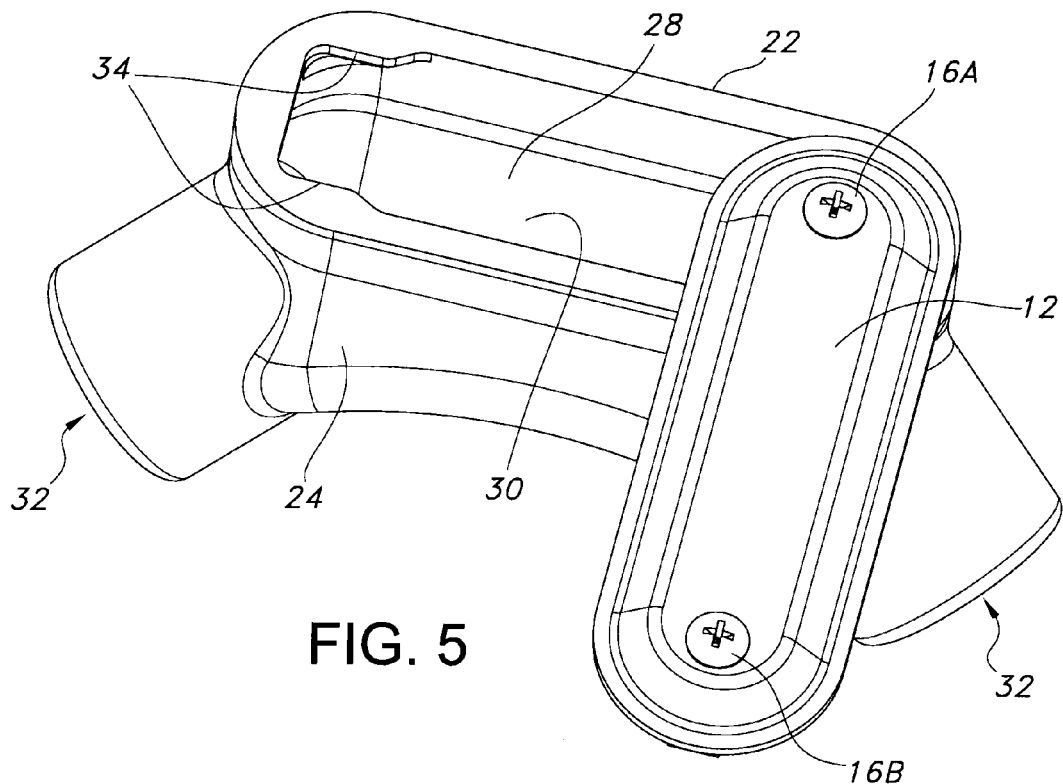
FIG. 5 shows a conduit body and the cover of FIG. 1 in a partially-attached configuration.

The inventive cover 10 may be only partially attached to the conduit body, such as by a single butterfly clip 14 so as to provide access to the interior of the conduit body. FIG. 5 shows the inventive cover 10 orthogonal or as partially attached to the conduit body 22 of the present invention by a single butterfly clip 14. Conduit body 22 generally includes side walls 24, a bottom wall 26, and an open end 28 located approximately opposite bottom wall 26. The open end 28 provides access to the interior chamber 30 of the conduit body 22. In order to provide passage of wire or cable through the conduit body 22, the conduit body 22 may include a plurality of hubs 32 located at approximately opposite ends of the conduit body 22. The hubs 32 may be located in any desired location, including extending from side walls 24, bottom wall 26, or combinations thereof. The hubs 32 are formed in any desired angular relation to the direction of elongation of conduit body 22, such as at a 90° angle to each other, with one hub 32 axially aligned with the direction of elongation of conduit body 22 and a second hub 32 at a right angle thereto. Alternatively, the hubs 32 may be axially aligned, or they may be disposed at any desired angle. In the present illustrated embodiment, two hubs 32 are shown, but any number of hubs 32 may be used if desired, depending on the direction that wires are to be fed through the conduit body 22.

Figure 6:
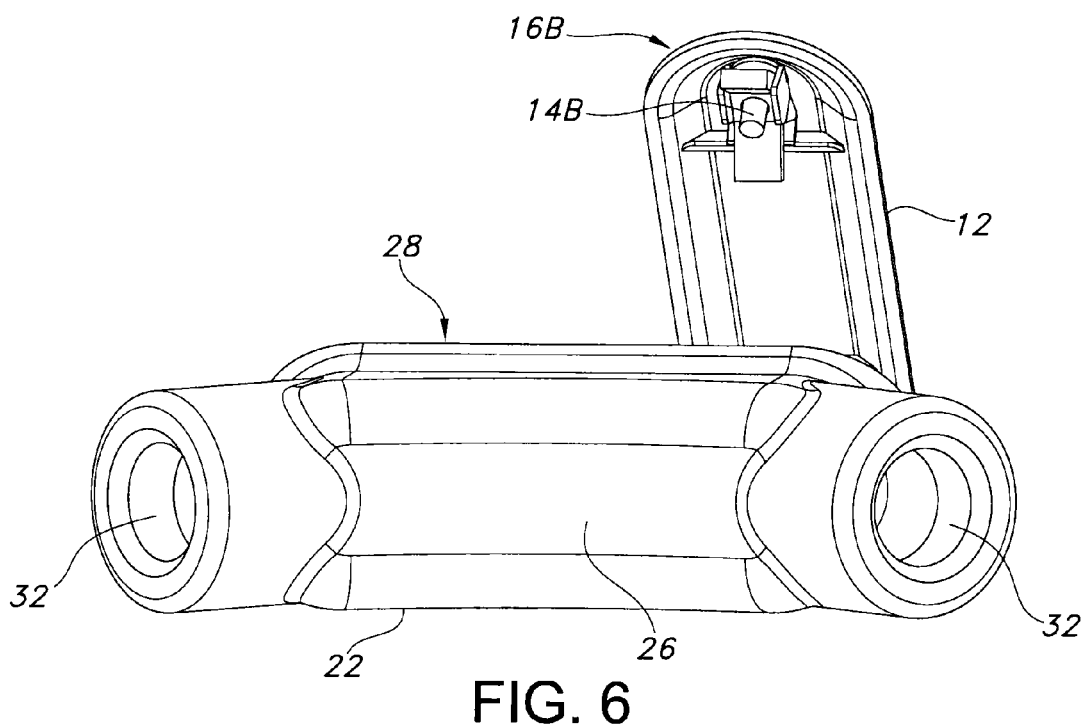
FIG. 6 shows the underside of a conduit body and the cover of FIG. 1 in a partially-attached configuration.

The conduit body 22, such as depicted in FIGS. 5 and 6, has an open end 28 located approximately opposite bottom wall 26, but the open end 28 may be located at any desired location on the conduit body 22. Open end 28 may be raised or angled with respect to the conduit body 22 to provide easier access to the interior chamber 30. Further, conduit body 22 may have a lip disposed at least partially along the open end 28. While previous conduit bodies, such as Form 7 conduit bodies, have lips only at opposite longitudinal ends, the present conduit body 22 has lips or side undercuts 34 that also extend partially along the interior sides of open end 28. These side lips or side undercuts 34 engage butterfly clips 14A and 14B when the cover 10 is mounted at an angle or preferably perpendicular to the longitudinal axis of the conduit body 22. Thus, butterfly clips 14A, 14B span transversely across open end 28 so as to engage the underside of side undercuts 34.

The open end 28 of the conduit body 22 aids in feeding the wires through the conduit body 22. By having an open end 28 in the conduit body 22, wires may be more easily pulled through one of the hubs 32 and fed through another. Preferably, the open end 28 is located at a location opposite the bottom wall 26 or any of the hubs 32. Further, the open end 28 allows for an easy inspection of the wires contained within the interior chamber 30 of the conduit body 22, when conduit body 22 is installed. Desirably, the cover 10 is sized to be at least as big as the open end 28, and most desirably is slightly larger than the open end 28.

Figure 8:
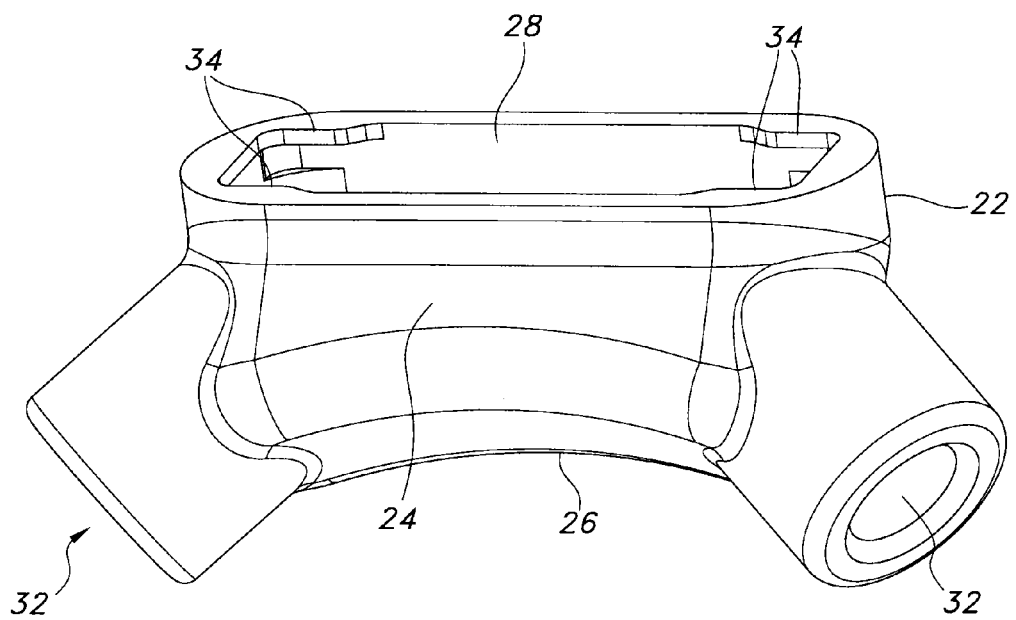
FIG. 8 shows a perspective view of a conduit body in accordance with the present invention.
Figure 9:
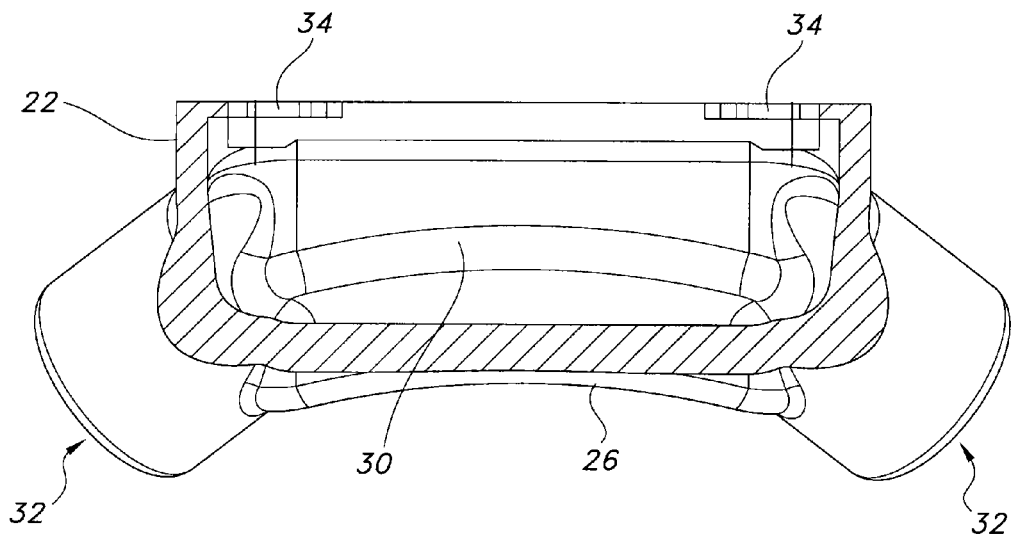
FIG. 9 shows a cut-away view of a conduit body in accordance with the present invention.

As seen in FIG. 5, the open end 28 preferably includes an extended side undercut area 34. The side undercut area 34 is preferably positioned at 90° from existing end undercuts in the body, which allow the user to simply slide the wings 18 of one butterfly clip 14 under the opposite extended undercuts 34 for attachment of cover 10 to the conduit body 22. Thus, the butterfly clip 14 spans across and permits securement of the cover 10 over one end region of the open wall 28. Any desired size of the extended side undercut area 34 may be used, and preferably the open end 28 has a pair of oppositely disposed extended side undercut areas 34, which may be seen in FIGS. 8 and 9. The opposite extended side undercut areas 34 are designed to engage the opposite wings 18 of a butterfly clip 14. Preferably, each butterfly clip 14 on the cover 10 is spaced and configured so as to engage the opposite extended side undercut areas 34 of the conduit body 22 when the cover 10 is positioned perpendicular to the conduit body 22. Alternatively, only one wing 18 of butterfly clip 14 will engage undercut area 34.

Figure 7:
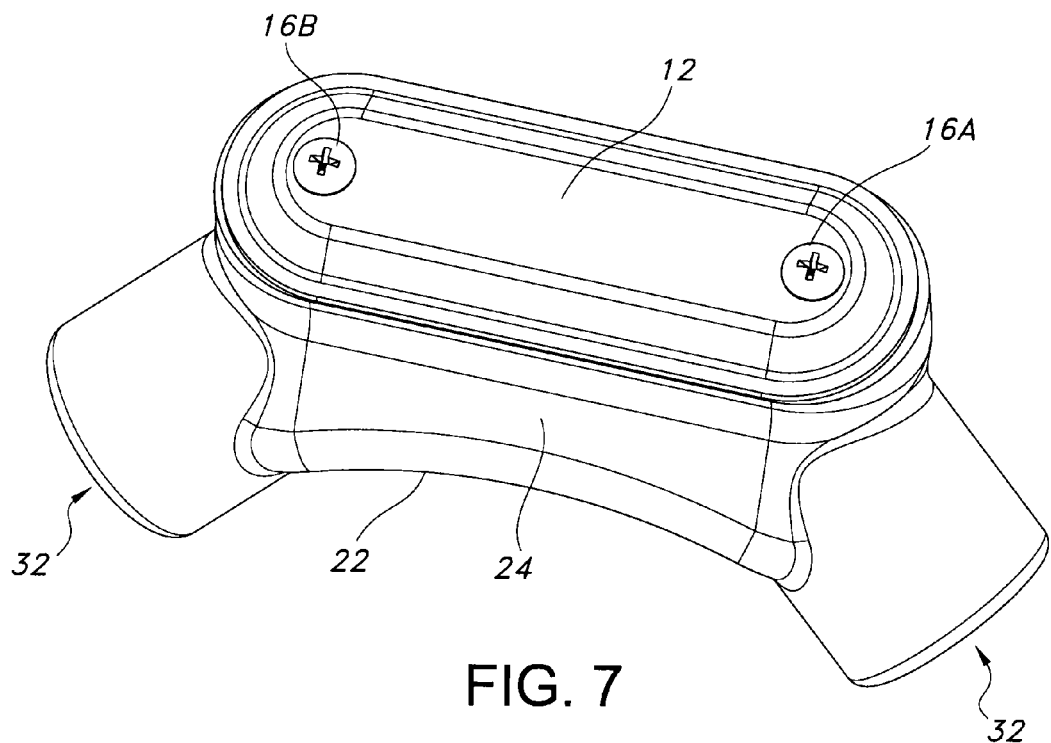
FIG. 7 shows a conduit body and the cover of FIG. 1 in a fully attached configuration.

When the user desires to fully close the open end 28 of the conduit body 22, for example, after inspection of the conduit has been completed, the user simply slides the cover 10 along the open area 28 of the conduit body 22 so as to disengage the butterfly clip 14 from interior extended undercuts 34. This frees cover 10 from the conduit body 22. Afterwards, cover 10 is placed over open area 28 to enclose the interior of the conduit body 22. Screws 16A, 16B may then be tightened to secure the butterfly clips 14A, 14B against the end undercuts of the conduit body 22 in typical fashion. In a fully engaged state, such as depicted in FIG. 7, the cover 10 fully closes the open area 28 of the conduit body 22.

In one aspect of the invention, shown in FIGS. 5 and 6, the cover 10 is only partially attached to the conduit body 22. In this aspect, only one butterfly clip 14A engages opposite extended undercut areas 34 of the conduit body 22. Thus, if screw 16 is loosened to disengage clip 14 from undercut area 34, the cover 10 may be pivoted while still remaining loosely attached to the conduit body 22. In this situation, one of the butterfly-shaped clips 14 is engageable with the interior of the conduit body 22 so as to permit transverse positioning of the cover 10 with respect to the open end 28. In this aspect, a portion of the open end 28 of the conduit body 22 may be left uncovered, so that a user may have access to the interior chamber 30, while the cover 10 is still attached to the conduit body 22. In this aspect, the user does not have to spend additional time looking for a cover, which may be extremely difficult to find without an extended search time. This aspect allows for the system (i.e., the conduit body 22 and the cover 10) to remain partially assembled and yet still provide access to the interior chamber 30 of the conduit body 22. After the user has completed the work required in the interior chamber 30, the installer needs only to loosen the one attached clip 14A, rotate the cover 10 so that it is aligned with the open area 28, and tighten both screws 16 in the normal fashion. Since the butterfly clips 14A, 14B are designed so that the clip does not rotate when tightened; the clips 14 are capable of engaging both end and side undercuts 34 depending on the orientation of the cover.

The bottom wall 26 may have any shape desired, including a substantially flat shape or a broad uniformly curved shape. Any curve of the bottom wall 26 preferably extends the entire length of bottom wall 26. Some embodiments may incorporate more than two hubs 32, and others may include more than one open area 28. In embodiments incorporating more than one open area 28, more than one cover 10 may be used to enclose the open area 28.

The conduit body 22 of the present invention is designed to facilitate the placement and feeding of wires and cables in any location desired. The conduit body 22 may be supported by the hubs 32 to which it is attached, or optionally the body 22 may be mounted to the side of a wall or other location. One of the perimetrical side walls 24 of the body 22 may serve as a mounting wall for mounting the body 22 to the side of a wall, if desired.

The present invention may also be used in a "stacked" fashion, where one conduit body 22 is installed directly above another conduit body 22. In this embodiment, the open end 28 is preferably angled so as to extend out toward the user and away from the wall to which it is mounted. The angled placement of the open end 28 allows for the user to more easily access the interior chamber 30 of the conduit body 22, and additionally allows for the cover 10 to be attached over the open end 28 more easily.

In another embodiment of the present invention, as depicted in FIGS. 10-14, the cover 10 may include a means for providing even more securement when the cover 10 is partially attached to the conduit body 22. As will be described in more detail below, the cover 10 may include one or more ledges 36 on the underside of the cover 10, the ledge 36 desirably being disposed at a location proximal to at least one of the butterfly-shaped clips 14. As with above, the ledge 36 may be made of the same material or different material from the other cover elements, including the cover 10, the body 12, the butterfly-shaped clips 14, the screws 16, the wings 18, or the walls 20.

Figure 10:
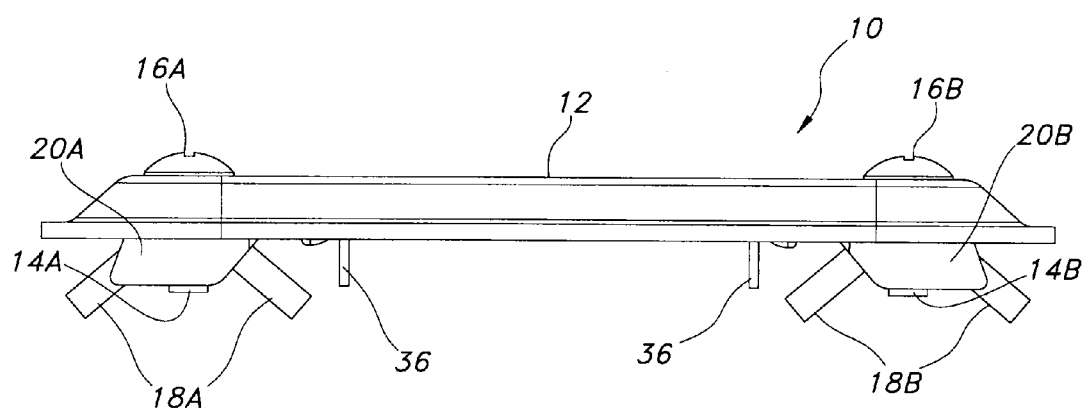
FIG. 10 shows a side angle of a second embodiment of a cover of the present invention.
Figure 11:
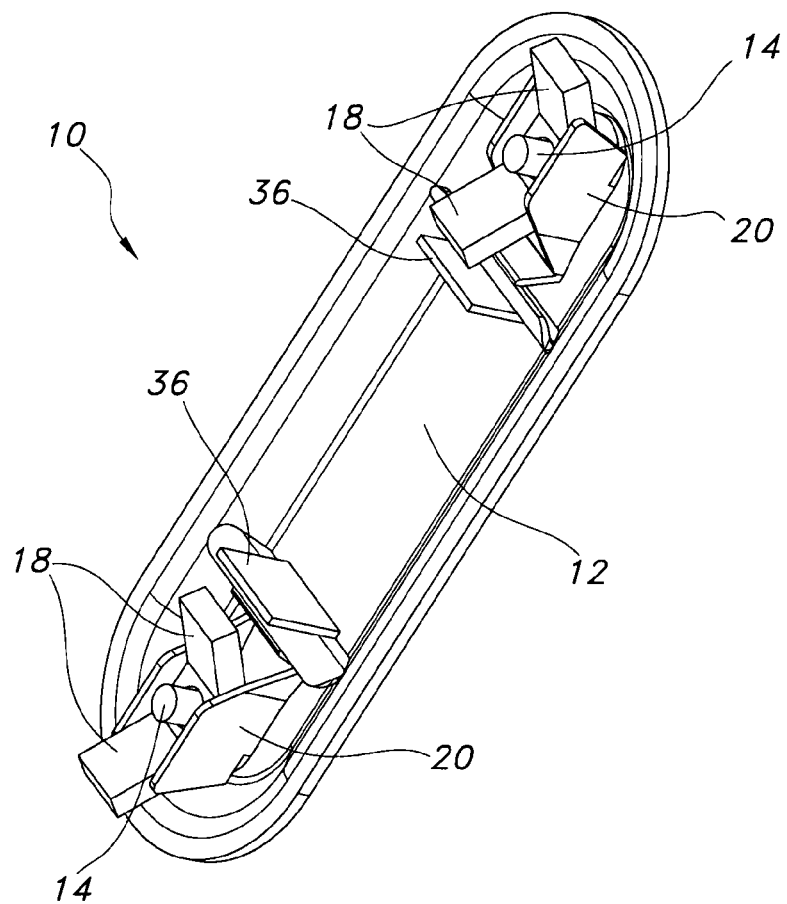
FIG. 11 shows a perspective view of the cover of FIG. 10.

If desired, ledge 36 may be disposed on the underside of the cover 10, along the elongate axis of the body 12 at a position proximal to at least one butterfly clip 14. Desirably, the ledge 36 is disposed at a location towards the interior of the body 12 (i.e., between the butterfly clips 14A, 14B). As seen in FIGS. 10 and 11, the cover 10 may include two ledges 36, each disposed along the elongate axis of the body 12, towards the interior portion of the body 12, at locations proximal to the butterfly clips 14.

As explained above, it may be desired that the cover 10 be only partially attached to the conduit body 22. In this aspect, only one butterfly clip 14A engages opposite extended undercut areas 34 of the conduit body 22. Thus, if screw 16 is loosened to disengage clip 14 from undercut area 34, the cover 10 may be pivoted while still remaining loosely attached to the conduit body 22. In this situation, one of the butterfly-shaped clips 14 is engageable with the conduit body 22 so as to permit transverse positioning of the cover 10 with respect to the open end 28. Desirably, when partially or temporarily attached in accordance with this invention, the cover 10 is disposed at a position that is approximately 90° to the longitudinal axis of the conduit body 22. As explained above, in this configuration, a portion of the open end 28 of the conduit body 22 may be left uncovered, so that a user may have access to the interior chamber 30, while the cover 10 is still partially attached to the conduit body 22.

Figure 12:
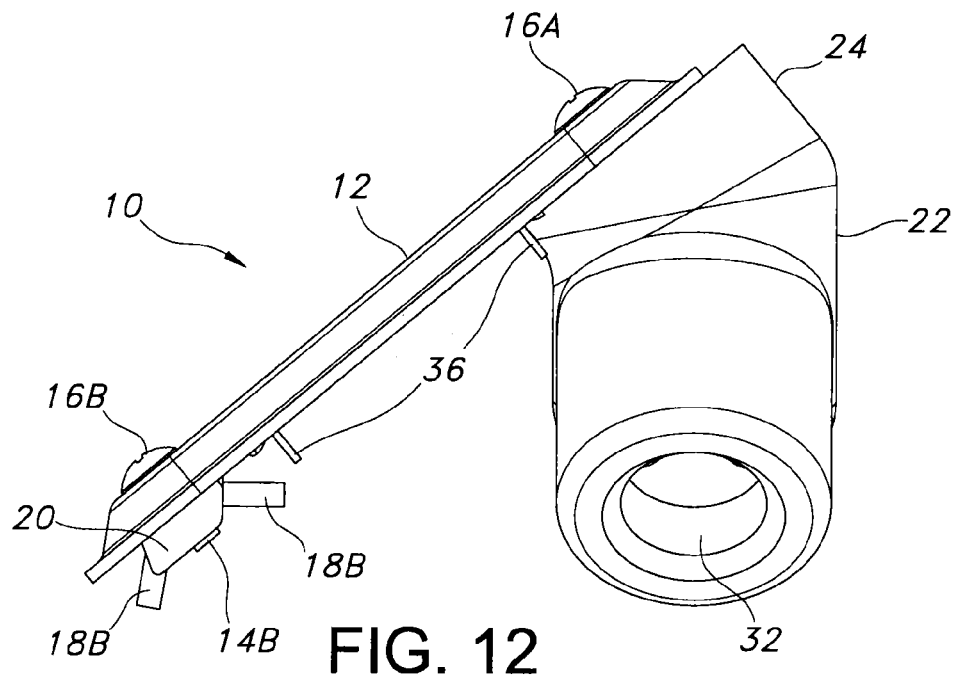
FIG. 12 shows a side view of the cover of FIG. 10 and a conduit body of the present invention.
Figure 13:
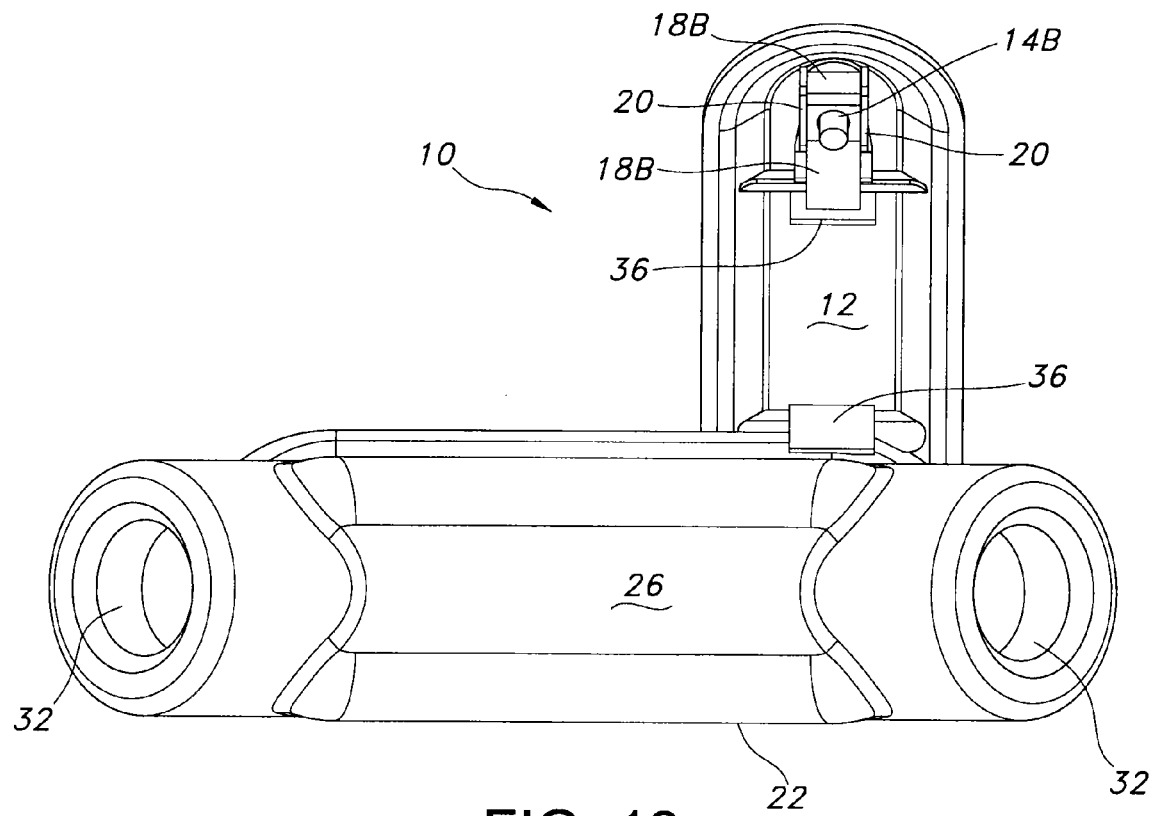
FIG. 13 shows the underside of a conduit body and the cover of FIG. 10 in a partially-attached configuration.
Figure 14:
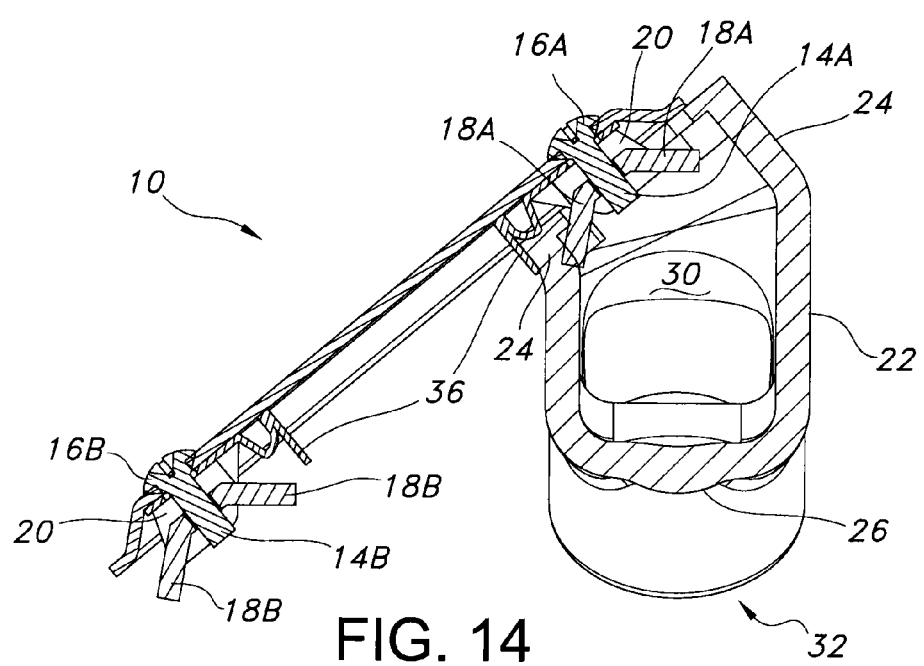
FIG. 14 shows a cut-away view of a conduit body and the cover of FIG. 10 in a partially-attached configuration.

With reference to FIGS. 12-14, the cover 10 may include optional ledge 36, extending from the underside of the cover 10 at a location proximal to at least one of the butterfly-shaped clips 14. The cover 10 may include one or more ledges 36, and preferably, the cover 10 may include one ledge 36 per butterfly-shaped clip 14. If desired, the cover may include only one ledge 36, disposed at any desired location on the cover 10. Further, the cover may include more than two ledges 36, each disposed at varying locations along the cover 10.

The ledge 36 is disposed at a position along the longitudinal axis of the conduit body 22, and preferably is located in a location between the butterfly-shaped clips 14. Desirably, the ledge 36 is disposed at a location slightly beyond the length of the wings 18 extending from the butterfly-shaped clip 14. In this position, the ledge 36 may engage the outer surface of one of the side walls 24 of the conduit body 22 when the cover 10 is in the partially attached configuration, giving more support to the connection of the cover 10 to the conduit body 22. To engage the ledge 36 with the side wall 24 of the conduit body 22, the user simply rotates the cover 10 such that it is disposed at a 90° angle to the longitudinal axis of the conduit body 22. The user may then rotate the screw 16 attached to the butterfly-shaped clip 14 in contact with the conduit body 22 to draw one or more wings 18 of butterfly-shaped clip 14 against undercut 34 and hence bias or compress one side wall 24 of conduit body 22 between wing 18/clip 14 and ledge 36. The cover 10 may then be secured to the conduit body 22 in the partially attached configuration. In the embodiment shown in FIG. 14, conduit body 22 is a larger sized conduit body such that wings 18 of butterfly clip 14 are unable to engage both, opposite undercut areas 34. In this situation, only one wing 18 is slipped under an undercut 34 which, upon tightening of screw 16, biases sidewall 24 against ledge 36.

The ledge 36 of the present invention may be particularly useful in securement of the cover 10 to a large-sized conduit body 22, especially Form 7 conduit bodies, which may not allow for adequate securement through one butterfly-shaped clip 14 alone. Further, when so connected, it is preferred for one end of cover 10 to span across open end 28 and engage or abut the opposite side wall 24. This prevents the other or free end of cover 10 from being pivoted clockwise when viewed as best seen in FIG. 14.

As explained above, the inventive cover 10 may be used with existing conduit bodies. Likewise, an existing cover (i.e., one with "L-shaped" clips as opposed to butterfly clips 14), may be used on a conduit body 22 that has an extended undercut 34. Thus, the user need not keep track of only mating the inventive cover 10 with the inventive conduit body 22. If a mismatch occurs, such as if the installer has an existing cover with the inventive conduit body 22, or an existing conduit body with the inventive cover 10, the system may still be assembled. The inventive designs allow for universal matching of existing covers and conduit bodies.

What is claimed is:

1. A cover for a conduit body device for accommodating wire therethrough comprising:
    a substantially flat elongated portion with at least two butterfly-shaped clips located at opposite ends of the elongated portion and a ledge disposed at a location proximal to at least one of said butterfly-shaped clips;
    wherein each said butterfly-shaped clip has a screw portion for securing said butterfly-shaped clip to an underside of said cover and a pair of opposed symmetrically extending wings; and
    wherein said symmetrically extending wings of said butterfly-shaped clips are positioned to engage an interior of a conduit body device when said cover and said conduit body device are orthogonal to each other,
    wherein said conduit body device comprises an elongate open wall with at least two expanded undercut regions positioned along opposite sides adjacent two ends of said open wall, wherein said ledge is capable of engaging an exterior of the conduit body at a location proximal to one of said expanded undercut regions when the cover is in a partially attached configuration.

2. The device of claim 1, wherein said butterfly clips are capable of engaging the interior of the conduit body device adjacent said opposed ends of said open wall of said conduit body.

3. The device of claim 1, wherein said butterfly-shaped clips are capable of engaging the interior of the conduit body device at said expanded undercut regions.

4. A conduit body device for accommodating wire therethrough said device comprising:
    a. a conduit body having a body interior and body exterior, elongate perimetrical side walls, a bottom wall, and an elongate open wall extending along the elongate perimetrical side walls defining a body interior; and
    b. a removable cover, said removable cover comprising:
        i. a substantially flat elongated portion; and
        ii. at least two butterfly-shaped clips located at opposite ends of the elongated portion,
        iii. a ledge positioned at a location proximal to at least one of said butterfly-shaped clips,
    wherein one of said butterfly-shaped clips is engageable with the interior of said conduit body, and said ledge is engageable with the exterior of said conduit body, so as to permit transverse positioning of said cover with respect to said open end.

5. The device of claim 4, wherein said open wall of said conduit body comprises at least two expanded undercut regions positioned at opposite sides of said open wall.

6. The device of claim 5, wherein said butterfly-shaped clips are capable of engaging the interior of the conduit body device at said expanded undercut regions.

7. The device of claim 6, wherein said ledge is capable of engaging the exterior of the conduit body device at a location proximal to said expanded undercut region when the cover is in a partially attached configuration.

* * * * *